(12) United States Patent
Michel et al.

(10) Patent No.: US 10,177,900 B2
(45) Date of Patent: *Jan. 8, 2019

(54) METHOD AND DEVICE FOR TRANSMITTING DATA BY INDUCTIVE COUPLING WITH CONTROLLED SELF-OSCILLATION

(71) Applicant: INSIDE SECURE, Meyreuil (FR)

(72) Inventors: Jean-Yves Michel, Vallauris (FR); Robert Schouten, Grasse (FR)

(73) Assignee: INSIDE SECURE, Meyreuil (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/620,335

(22) Filed: Jun. 12, 2017

(65) Prior Publication Data

US 2017/0279596 A1 Sep. 28, 2017

Related U.S. Application Data

(63) Continuation of application No. 15/067,965, filed on Mar. 11, 2016, now Pat. No. 9,680,633, which is a (Continued)

(30) Foreign Application Priority Data

Sep. 13, 2013 (FR) ..................... 13 58837

(51) Int. Cl.
*H04L 7/00* (2006.01)
*G06K 19/07* (2006.01)
*H04B 7/26* (2006.01)

(52) U.S. Cl.
CPC ........ *H04L 7/0087* (2013.01); *G06K 19/0723* (2013.01); *H04B 7/2656* (2013.01)

(58) Field of Classification Search
CPC ............ H04B 10/0795; H04B 10/2507; H04B 7/2656; H04B 10/07957; H04B 1/04; H04L 7/0087
(Continued)

(56) References Cited

U.S. PATENT DOCUMENTS 2,533,146 A * 12/1950 Schwalm ............... H04B 14/02
342/203
3,509,569 A 4/1970 Boddy
(Continued)

FOREIGN PATENT DOCUMENTS

FR 2681166 A1 3/1993
FR 2743970 A1 7/1997
(Continued)

OTHER PUBLICATIONS

English Translation of International Search Report from corresponding application PCT/FR2014/052218, dated Dec. 8, 2014, 3 pages.
(Continued)

*Primary Examiner* — Emmanuel Bayard
(74) *Attorney, Agent, or Firm* — Brake Hughes Bellermann LLP

(57) ABSTRACT

In a general aspect, a method for transmitting data by inductive coupling can include applying, at a rate of a data-carrying signal, a plurality of bursts of a periodic signal to a tuned inductive antenna circuit. The method can also include producing, in the tuned inductive antenna circuit, an antenna signal. The antenna signal can generate a magnetic field. The method can further include delimiting an amplitude of each burst of the plurality of bursts of the periodic signal in accordance with an envelope signal having a rising edge and a falling edge. The delimiting the amplitude of each burst of the plurality of bursts of the periodic signal can include generating the plurality of bursts of the periodic (Continued)

signal using a set of points. The set of points can define, by discrete values, a burst of the plurality of bursts of the periodic signal.

20 Claims, 3 Drawing Sheets

Related U.S. Application Data continuation of application No. PCT/FR2014/052218, filed on Sep. 8, 2014.

(58) Field of Classification Search
USPC .......................................... 375/295–297, 300
See application file for complete search history.

(56) References Cited

U.S. PATENT DOCUMENTS

| | | | |
|---|---|---|---|
| 3,579,274 A | 5/1971 | Jensen et al. | |
| 4,480,485 A * | 11/1984 | Bradshaw | G01F 1/667 |
| | | | 73/861.28 |
| 4,510,495 A * | 4/1985 | Sigrimis | A01K 11/006 |
| | | | 119/51.02 |
| 5,144,258 A * | 9/1992 | Nakanishi | H03G 3/3047 |
| | | | 330/129 |
| 5,187,719 A * | 2/1993 | Birgenheier | G01R 25/00 |
| | | | 332/150 |
| 5,315,258 A * | 5/1994 | Jakkula | G01N 22/04 |
| | | | 324/634 |
| 5,485,851 A * | 1/1996 | Erickson | A61N 1/3601 |
| | | | 600/529 |
| 5,889,490 A | 3/1999 | Wachter et al. | |
| 6,046,623 A * | 4/2000 | Hasegawa | G08B 13/2402 |
| | | | 324/675 |
| 6,191,724 B1 * | 2/2001 | McEwan | G01S 7/35 |
| | | | 342/118 |
| 6,353,642 B1 * | 3/2002 | Asahara | H03J 7/04 |
| | | | 375/326 |
| 6,580,901 B1 * | 6/2003 | Mochizuki | H03G 3/004 |
| | | | 455/126 |
| 9,680,633 B2 * | 6/2017 | Michel | G06K 19/0723 |
| 2003/0035342 A1 * | 2/2003 | Harrington | G01S 7/52026 |
| | | | 367/127 |
| 2003/0071754 A1 * | 4/2003 | McEwan | G01S 5/06 |
| | | | 342/464 |
| 2003/0202537 A1 | 10/2003 | Rogerson et al. | |
| 2004/0135992 A1 | 7/2004 | Munro | |
| 2005/0017894 A1 * | 1/2005 | Fullerton | G01S 7/282 |
| | | | 342/118 |
| 2008/0253052 A1 * | 10/2008 | Crewson | H03K 3/57 |
| | | | 361/98 |
| 2009/0286500 A1 * | 11/2009 | Stengel | H04B 1/1638 |
| | | | 455/318 |
| 2011/0006824 A1 * | 1/2011 | Kang | H04W 52/0229 |
| | | | 327/175 |
| 2011/0095889 A1 * | 4/2011 | Yang | G08B 13/2477 |
| | | | 340/572.1 |
| 2012/0071089 A1 | 3/2012 | Charrat et al. | |
| 2012/0082199 A1 | 4/2012 | Blech | |
| 2013/0258312 A1 | 10/2013 | Lewis | |
| 2014/0035486 A1 | 2/2014 | Ando et al. | |
| 2014/0278214 A1 | 9/2014 | Broad et al. | |
| 2016/0197718 A1 | 7/2016 | Michel et al. | |

FOREIGN PATENT DOCUMENTS

| | | |
|---|---|---|
| GB | 2242043 A | 9/1991 |
| WO | 2012038664 A2 | 3/2012 |

OTHER PUBLICATIONS

Written Opinion from corresponding application PCT/FR2014/052218, dated Dec. 8, 2014, 6 pages.
International Preliminary Report on Patentability from corresponding application PCT/FR2014/052218, dated Dec. 17, 2015, 14 pages.

* cited by examiner

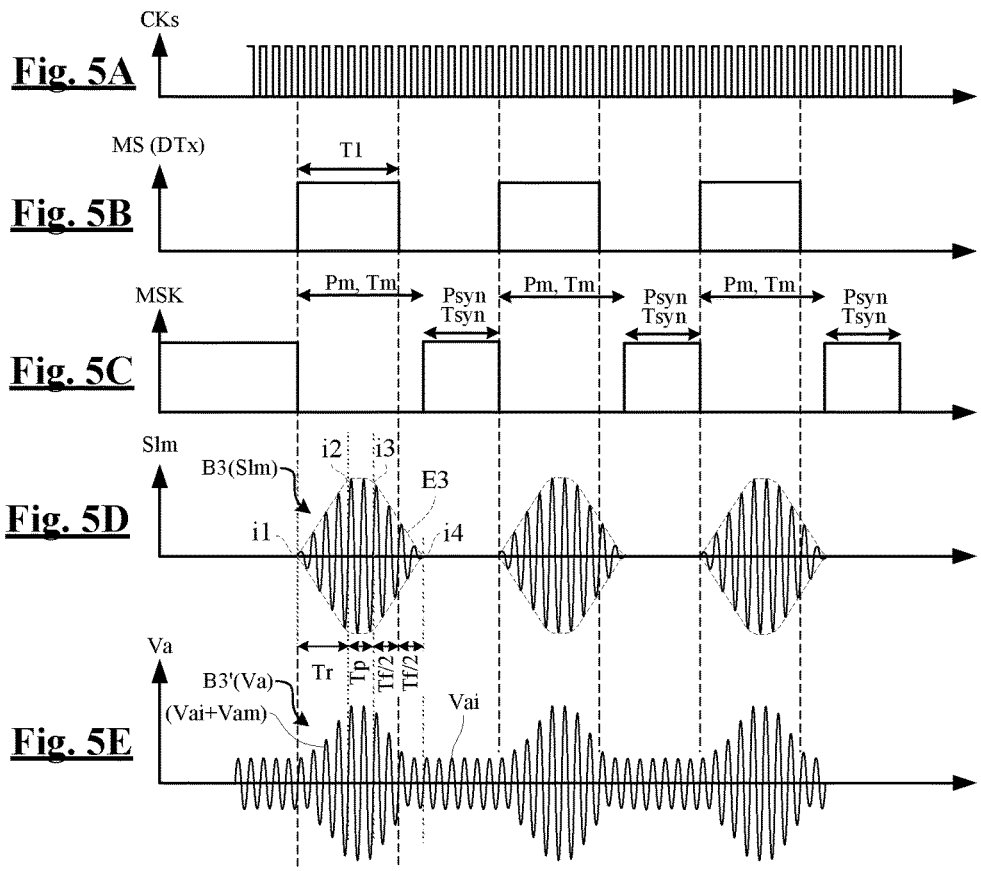
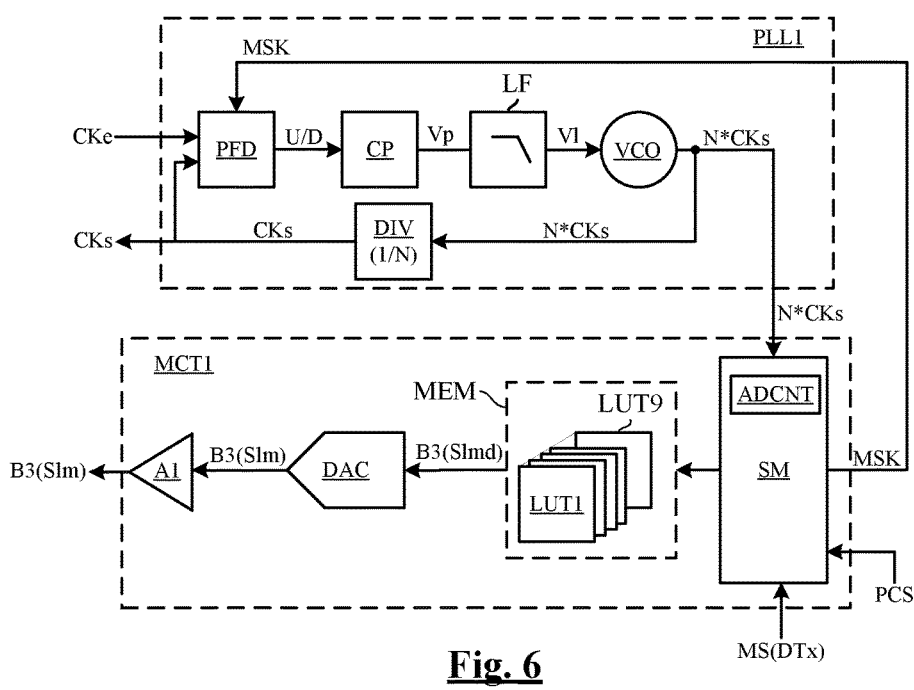

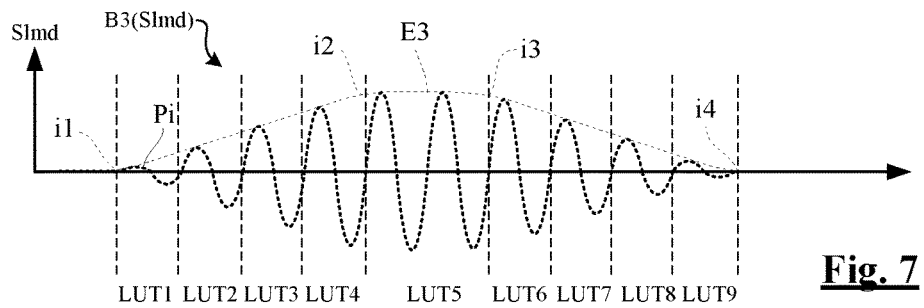
Fig. 7
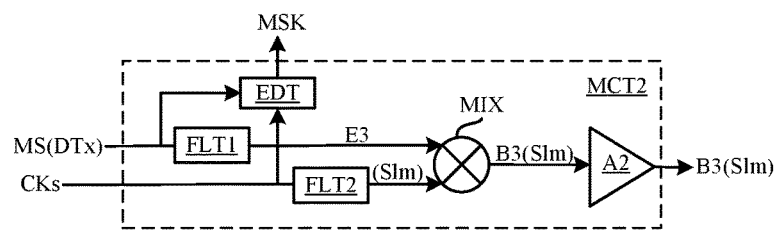
Fig. 8
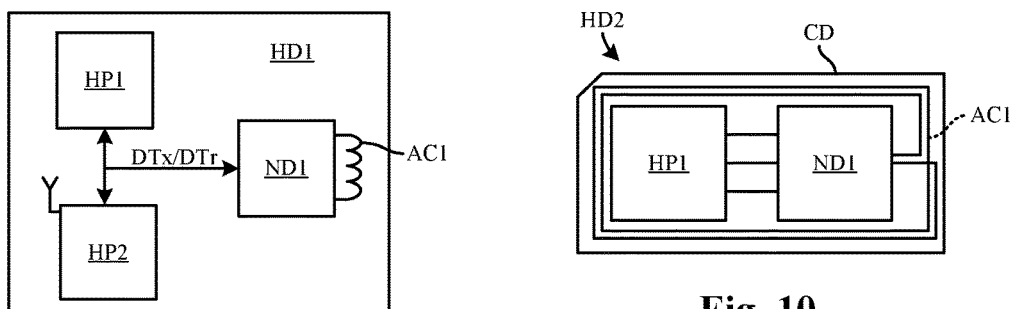
Fig. 9
Fig. 10
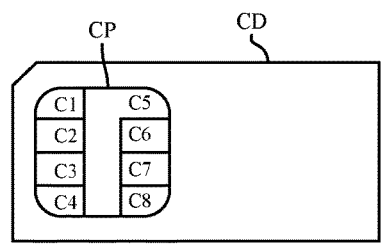
Fig. 11

METHOD AND DEVICE FOR TRANSMITTING DATA BY INDUCTIVE COUPLING WITH CONTROLLED SELF-OSCILLATION

CROSS-REFERENCE TO RELATED APPLICATIONS

This application is a continuation of U.S. application Ser. No. 15/067,965, filed Mar. 11, 2016, which is a continuation of International Patent Application No. PCT/FR2014/052218, filed Sep. 8, 2014, which claims priority to French Patent Application No. 13 58837, filed Sep. 13, 2013, the contents of which are all hereby incorporated by reference in their entireties.

TECHNICAL FIELD

The present disclosure relates to apparatus and methods for transmitting data by inductive coupling.

BACKGROUND

Current approaches for transmitting data by inductive coupling using active load modulation can include resynchronizing a frequency of a periodic signal to that of an external magnetic field after each application of a burst (periodic signal burst, signal burst, etc.) to the antenna circuit, instead of resynchronizing this signal before each new data frame. Such active load modulation approaches can, therefore, include alternating periods of emitting bursts and phases (periods) of resynchronization to the external magnetic field.

However, in such approaches, after applying a burst of the periodic signal to the antenna circuit, the antenna signal can have a ringing that is superimposed on the "useful" antenna signal induced by the external magnetic field, which can adversely affect the resynchronization process by interfering with the external field, which is used as a resynchronization signal for the resynchronization process. That is, if the antenna signal includes oscillatory residues (transient oscillations) from a burst that has just been applied to the antenna circuit, those oscillatory residues can be superimposed on the useful antenna signal induced by the external field and can adversely affect the resynchronization process to the external field.

For example, FIG. 1 illustrates a shape of a burst B1 of a periodic signal Slm applied to an antenna circuit ACT, and the resulting antenna signal Vam for such current approaches. The antenna circuit ACT is a resonant circuit tuned to a frequency of the periodic signal Slm, and includes, for example, an antenna coil AC, a series capacitor Ca and a parallel capacitor Cb. The burst B1, or "incident burst", produces, in the antenna circuit, a burst B1' of antenna signal Vam, or a "resulting burst", which then generates a burst of magnetic field of the same (substantially the same) shape as the burst B1.

The incident burst B1 in FIG. 1 is delimited in its duration and amplitude by an envelope signal E1 that is square in shape, and of duration T1, having a rising edge and a falling edge. The rising edge extends between a low inflection point i1 and a high inflection point i2. The falling edge extends between a high inflection point i3 and a low inflection point i4. The amplitude of the periodic signal Slm is zero (approximately zero) before the rising edge and after the falling edge, and is generally constant between the two edges. As shown in FIG. after applying the incident burst B1, the antenna signal Vam has a transient oscillation 1 of non-insignificant amplitude that may, in certain cases, have overshoots 2 of an amplitude greater than the maximum amplitude of the antenna signal Vam during the application of the incident burst B1. As a result, the resulting burst B1' has a duration T1' that may be greater than the duration T1 of the incident burst B1. When the time T1'-T1 is equal to or greater than a time separating the emission of two bursts B1, the device that emits the bursts B1 cannot be resynchronized to an external field, at the risk of resynchronizing to the signal the device is generating.

To overcome this drawback, current approaches can include short-circuiting or de-tuning the antenna circuit ACT by means of a switch (e.g., to electrical ground), which short-circuiting or de-tuning can occur immediately after applying the incident burst B1. These active load modulation approaches can then include, after applying the burst B1 and before the resynchronization phase, a damping phase during which the antenna circuit is short-circuited or de-tuned by the switch, followed by a restoration phase during which the useful antenna signal induced by the external magnetic field is restored by the external magnetic field without being "polluted" by (being superimposed with) the transient oscillation generated by the incident burst B1.

In such approaches, however, the damping switch must be able to withstand antenna voltages that can reach 10 to 15 V. Some technologies that are commonly used to produce circuits for using inductive coupling to transmit data (e.g., near-field communication (NFC) devices that are integrated on semiconductor chips), such as deep-submicron technologies, may not allow for producing transistors (switches) that are capable of withstanding such voltages without being damaged.

Accordingly, approaches for active load modulation that are implemented without the use of a damping switch are desirable.

In other words, it may be desirable to implement approaches for transmitting data by emitting bursts of magnetic field, in which the self-oscillation phenomenon of an associated antenna circuit is controlled by a mechanism other than a damping switch.

SUMMARY

In a general aspect, a method for transmitting data by inductive coupling can include applying bursts of a periodic signal to a tuned inductive antenna circuit to produce an antenna signal generating a magnetic field. The amplitude of each burst can be delimited by an envelope signal having a rising edge and a falling edge. The method can also include shaping at least the falling edge of the envelope signal using a digital or analog shaping circuit, so as to attenuate or remove transient oscillations of the antenna signal that can appear in the antenna circuit after each application of a burst of a plurality of bursts of periodic signal.

According to one embodiment, the falling edge of the envelope signal can be shaped so that its first derivative does not exceed a limit value determined by taking into account a maximum amplitude of the transient oscillations that may be tolerated in the antenna circuit.

According to one embodiment, the falling edge of the envelope signal can be shaped so that its first derivative has a maximum value equal to $A0*\pi*Fc/2$, Fc being the frequency of the periodic signal, and A0 the amplitude of the envelope signal.

According to one embodiment, the falling edge of the envelope signal can be shaped so that immediately after applying a burst of the periodic signal (directly after, after, etc.), where the antenna signal has, in the absence of an external magnetic field, an amplitude lower than a percentage of the maximum amplitude it has during the application of the burst, where the percentage is between 5% and 50%.

According to one embodiment, the method can include shaping the falling edge of the envelope signal to have a shape determined by a mathematical function of which the derivative is a continuous function.

According to one embodiment, the method can include shaping the falling edge to have a shape determined by a raised cosine function calculated on a time scale, such that it has a value of 1 at a high inflection point of the falling edge and a value of 0 at a low inflection point of the falling edge.

According to one embodiment, the method can include shaping the falling edge of the envelope signal to have a shape determined by a set of points stored in a memory and defining, by discrete values, a burst of the periodic signal.

According to one embodiment, the method can include shaping the rising edge of the envelope signal such that a first derivative of the rising edge (e.g., of a mathematical function corresponding with the rising edge) is continuous.

According to one embodiment, the periodic signal can have a total harmonic distortion rate lower than 20%.

According to one embodiment, the method can be applied to the transmitting of data by active load modulation, where bursts of the periodic signal are applied to the antenna circuit in the presence of an external, alternating magnetic field, and the method can include, between two applications of a burst of the periodic signal to the antenna circuit, synchronizing a frequency of the periodic signal with the frequency of the external magnetic field.

In another general aspect, a device for transmitting data by inductive coupling can include a tuned inductive antenna circuit and an amplitude modulation circuit for applying bursts of a periodic signal to the antenna circuit. The tuned inductive antenna circuit can produce an antenna signal generating a magnetic field. An amplitude of each burst can be delimited (defined) by an envelope signal having a rising edge and a falling edge. The modulation circuit can be configured to implement methods as described herein.

In another general aspect, a portable electronic object (electronic device, portable electronic device, etc.) can include a device for transmitting data by inductive coupling, such as using the approaches described herein.

BRIEF DESCRIPTION OF DRAWINGS

Example implementations will be described below in relation with, but not limited to, the accompanying figures, in which:

FIGS. 5A to 5E are timing diagrams showing various signals corresponding with operation of the device in FIG. 4, according to an implementation.

FIG. 6 is a block diagram that shows a phase locked loop and a modulation circuit that can be implemented in the NFC device of FIG. 4, according to an implementation.

FIG. 7 illustrates a curve of a digital signal supplied by the modulation circuit of FIG. 6, according to an implementation.

FIG. 8 is a block diagram that shows another modulation circuit that can be implemented in in the NFC device of FIG. 4, according to an implementation.

FIGS. 9, 10 and 11 show portable electronic objects (devices) including an NFC device, according to various implementations.

DETAILED DESCRIPTION

Figure 1:
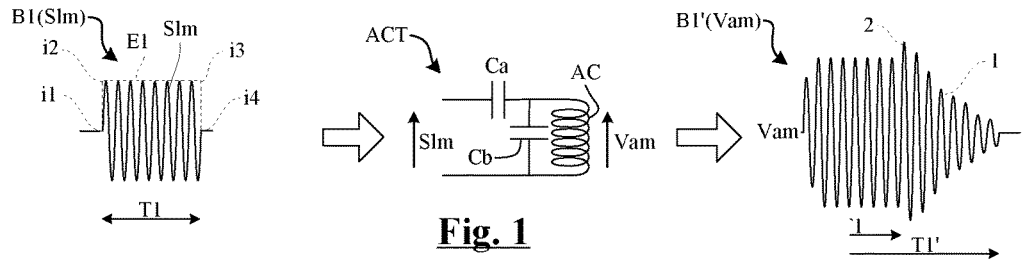
FIG. 1 (described above) shows a shape of an incident burst of a periodic signal applied to an antenna circuit, the antenna circuit and a shape of a resulting burst without attenuation of transient oscillation after application of the incident burst.

This disclosure is related to apparatus and methods for transmitting data by inductive coupling. In the approaches described herein, bursts of a periodic signal can be applied to a tuned inductive antenna circuit, where the applied bursts produce an antenna signal that generates a magnetic field. The amplitude of each burst can be delimited by an envelope signal having a rising edge and a falling edge.

In at least some of the implementations described herein, active load modulation for a Near Field Communication (NFC) device can be implemented. Example methods can include applying bursts of a periodic signal to an antenna circuit in the presence of an external magnetic field emitted by an NFC reader. The bursts of the periodic signal can generate corresponding bursts of a magnetic field that is superimposed on the magnetic field emitted by the NFC reader, and can be perceived by the NFC reader as passive load modulation. One advantage of active load modulation, as compared to passive load modulation, is that active load modulation can be used over greater communication distances.

As discussed above, FIG. 1 illustrates a response of a tuned inductive antenna circuit ACT to an incident burst B1 of a periodic signal Slm, the amplitude of which is delimited by an envelope signal E1 that is square in shape. This response (shown on the right side of FIG. 1) can be include a resulting burst B1', which has a transient oscillation of the antenna signal Vam that is present after applying the incident burst B1.

Some embodiments described herein are directed to methods where it is possible to control a response of an inductive antenna circuit to an incident burst of a periodic signal, and thus to control a shape of the resulting burst, without requiring a damping switch. Such methods can be implemented in conjunction with active load modulation techniques to enable resynchronization of the periodic signal Slm to an external field after emitting a burst, but can find other applications, such as at least those described herein.

The implementations described herein can be implemented using resonant circuits, where bursts of a periodic signal are applied to a tuned inductive antenna circuit. In such resonant circuits, application of an excitation signal, with a shape corresponding with a step function, can result in a transient oscillation of the resonant circuit due to the fact that such step functions have discontinuous derivatives. A square signal is a specific case of a step function, and has a derivative that tends towards plus infinity on its rising edge and towards minus infinity on its falling edge. A "real" (ideal or nearly-ideal) square signal, e.g., supplied by an electronic circuit, even if it includes rising and falling edges that are not perfectly vertical due to parasitic capacitances or inductances in associated transmission lines, can, however, still have significant jumps (discontinuities) in a derivative of a corresponding mathematical function (e.g., at low i1 and high i2 inflection points of the rising edge and at low i3 and high i4 inflection points of the falling edge). These derivative jumps (discontinuities, derivative discontinuities, etc.), without necessarily tending towards infinity or negative infinity, are also considered in the context of the implementations described herein as discontinuities, in that they can be responsible for an oscillatory response of the antenna circuit to which the excitation signal is applied.

Such transient oscillatory responses can be attenuated or even removed (substantially removed) by using an excitation signal having a continuous derivative. In particular, mathematical principles in the context of the implementation of a Fast Fourier Transform (FFT) have defined so-called window functions, or "observation window functions", such as the Hann function, enabling a signal to be sampled with a view to its Fast Fourier analysis on a finite number of points, without generating any spurious harmonic components on the edge of the window that would distort the harmonic analysis of this signal. When they are used to shape an excitation signal applied to a resonant circuit, such functions do not (may not) cause any transient oscillatory response in the resonant circuit, or can cause a greatly attenuated transient response.

In some embodiments, signal shaping (e.g., of a periodic signal, such as Slm) can be implemented using an envelope signal that is applied to a burst of the periodic (e.g., excitation) signal Slm, rather than directly shaping a periodic signal that is applied to a tuned inductive antenna circuit. In such approaches, the envelope signal can be considered as a signal that is separate from the periodic signal Slm. The envelope signal can be further considered as being responsible for reducing and/or preventing a self-oscillation effect (e.g., as a result of delimiting the periodic signal Slm). However, even in such approaches, a form of the periodic (antenna excitation) signal Slm should also be considered, e.g., should not be a square wave signal with sharp (vertical or nearly-vertical) falling and/or rising edges. In such implementations, the envelope signal can be used to reduce or eliminate an oscillatory response (transient oscillation) of the antenna circuit, such as when an amplitude of a periodic signal Slm that a corresponding envelope signal delimits (shapes) has a low harmonic distortion rate and is not particularly susceptible to generating such oscillatory responses.

Figure 2:
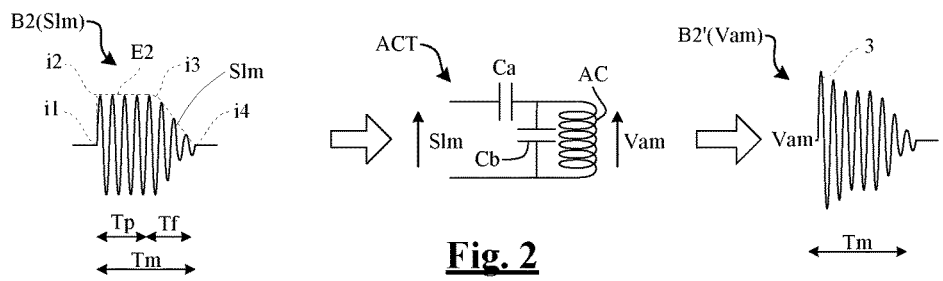
FIG. 2 shows a shape of an incident burst of a periodic signal applied to an antenna circuit, the antenna circuit and a shape of a resulting burst, according to an implementation.
Figure 3:
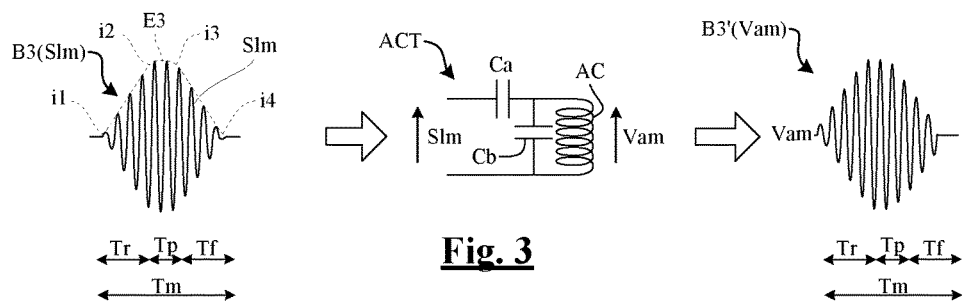
FIG. 3 shows a shape of another incident burst of a periodic signal applied to an antenna circuit, the antenna circuit and a shape of a resulting burst, according to an implementation.

According to an embodiment, a burst B2(Slm) of the periodic signal Slm can be shaped as shown in FIG. 2, so as to have (be limited by) an envelope signal E2 with a continuous derivative on its falling edge. According to another embodiment, a burst B3(Slm) of the periodic signal Slm can be delimited (shaped) as shown in FIG. 3, so as to have (be delimited by) an envelope signal E3 having a continuous derivative on its rising edge and on its falling edge.

In the context of the present disclosure, a "continuous derivative" can include implementations in which the derivative has value jumps (discontinuities) that are acceptable for the intended application, e.g., value jumps (discontinuities) that do not exceed a limit value determined by taking into account a maximum amplitude of transient oscillations that may be tolerated in the antenna circuit and are, therefore, not considered to be discontinuities. Such a maximum amplitude can depend on the intended application, or the particular implementation.

Signals having such continuous derivatives can be implemented in a number of ways. For example, in some implementations, such signals can be implemented empirically, e.g., by searching for, for an antenna circuit of known structure, using simulation tools, shapes of envelope signals having jumps (discontinuities) in derivative values at its inflection points that are below a certain threshold, such that an oscillatory response of the antenna circuit is acceptable for the intended application. For example, in an implementation of active load modulation, a transient oscillating period of a duration less than a time period available to resynchronize the modulating device to the external magnetic field can be determined.

In other implementations, a digital limit to derivative jumps (e.g., at inflection points) can be defined. As indicated above, a real derivative of a square envelope signal applied to a transmission line having parasitic capacitances and/or inductances can have no derivative jumps that tend toward infinity and is thus, stricto sensu (in a narrow sense), "continuous" due to these parasitic elements. However, such derivatives can have value jumps (discontinuities) that result in an oscillatory response of a corresponding antenna circuit that may be unacceptable for the intended application. Furthermore, even if a corresponding theoretical derivative of such a signal is not continuous, a trapezoidal envelope signal can substantially improve a response of the antenna circuit (e.g., reduce or eliminate transient oscillation) compared to an envelope signal that is square in shape. Thus, a "continuous derivative" in the context of at least some of the embodiments described herein can be achieved using an envelope signal having a derivative that does not exceed a predetermined limit, such as a limit that corresponds with a fall time of the envelope signal being at least greater than or equal to a period of a corresponding periodic signal Slm. For instance, this limit can be equal to $A0*\pi*Fc/2$, where Fc is a frequency of the signal Slm, and A0 is an amplitude of the envelope signal. In an application where Fc=13.56 MHz, a maximum value of the derivative of the envelope signal can be equal to $A0*21.29*10^6 s^{-1}$, $s^{-1}$ indicating reciprocal second or inverse second.

In FIG. 2, a duration of an incident burst B2 of a periodic signal Slm is shown as Tm. An envelope signal E2 includes: (i) a steep rising edge between the inflection point i1 and the inflection point i2, of a theoretically zero duration; (ii) a plateau of duration Tp between the inflection point i2 and the inflection point i3; and (iii) a gentle falling edge substantially in the form of a half bell, of duration Tf, between the inflection point i3 and the inflection point i4. This shape of a falling edge with gentle contours can be determined (shaped) so as to have a continuous derivative, such as described herein.

As shown in FIG. 2, a resulting burst B2' of antenna signal Vam produced in the antenna circuit ACT has an overshoot 3 caused by the rising edge of the envelope signal E2, but has no transient ringing caused by the falling edge. The effective duration of the resulting burst B2' is equal to the duration Tm of the incident burst B2.

In FIG. 3, a duration of an incident burst B3 of a periodic signal Slm is also shown (as in FIG. 2) as Tm. An envelope signal E3 of the incident burst B3 has axial symmetry and includes: (i) a gentle rising edge in the form of a half bell between the inflection point i1 and the inflection point i2, of duration Tr; (ii) a plateau of duration Tp between the inflection point i2 and the inflection point i3; and (iii) a gentle falling edge in the form of a half bell, of duration Tf, from the inflection point i3 to the inflection point i4. The antenna signal Vam produced in the circuit ACT of FIG. 3 has no overshoot or transient oscillation and an effective duration of a resulting burst BY is equal to a duration Tm of the burst B3.

The shapes of the resulting bursts B2', BY shown in FIGS. 2 and 3 are "ideal". However, in practice, a degree of attenuation of the ringing that is present after applying the respective incident bursts depends on the precision of the approach used to shape the envelope signal of the incident burst and the shaping that is applied to the burst. For instance, the incident burst may be shaped on its falling edge only (e.g., as with the burst B2 in FIG. 2) or on its rising and falling edges (e.g., as with the burst B3 in FIG. 3). The use of a burst of the type shown in FIG. 3 (burst B3) may be advantageous to use in place of a burst of the type shown in FIG. 2 (burst B2) when the rising edge of that burst (of the type shown in FIG. 2) generates transient oscillations of a duration greater than a duration of the burst.

In other implementations, shaping edges of a burst, so that their derivatives are continuous, may be achieved using a low-pass analog filter of order 1 or of order 2, such that the low-pass filter transforms a square envelope signal into an envelope signal having softened edges. In still other implementations, shaping of edges of a burst, so that their derivative is continuous, may be achieved with high precision by synthetizing the periodic signal Slm (e.g., based on a mathematical function, such as those described herein) to digitally control its amplitude variations.

In some implementations, using the approaches described with respect to FIGS. 2 and 3, an amplitude of ringing of the antenna signal Vam after applying an incident burst (e.g., after the last inflection point i4) may not be zero (e.g., completely attenuated). For instance, the amplitude of the ringing may merely be lower (attenuated to be lower) than a maximum amplitude of the antenna signal Vam during application of the incident burst of the periodic signal Slm (e.g., B2 or B3) in a range of between 5% and 50%, or in a range of between 1% and 50%. An "imperfect" attenuation (less than 100% attenuation), such as in the embodiments disclosed herein, can be sufficient to facilitate proper resynchronization to the externally applied magnetic field.

For example, in an implementation of active load modulation that includes resynchronization to an external magnetic field immediately after applying an incident burst, an amplitude of ringing that may be tolerated after the incident burst, (e.g., after the inflection point i4) and during resynchronization, can depend on an amplitude of the signal induced by the external magnetic field and, more particularly, on a ratio between the amplitude (e.g., a maximum amplitude) of the induced signal and an amplitude (e.g., a maximum amplitude) of the ringing. For example, in certain implementations, to obtain a phase error below 30° (e.g., in accordance with one or more standards), the amplitude of the ringing should not exceed 57.7% of the amplitude of the induced signal. This ratio corresponds to the above-mentioned ranges, which were expressed by percentage ranges relative to a maximum amplitude of the antenna signal Vam during application of an associated incident burst, without specifically referring to an amplitude of the signal induced by the external field.

In some implementations, a restoration period can be implemented after a period of active load modulation (and a corresponding resynchronization process). In such approaches, in order to ensure that an amplitude ratio (such as described herein) is less than 57.7% at the time of commencing a resynchronization process, a time remaining to proceed with the resynchronization process can depend on a frequency of a data signal transmitted using the incident bursts, which can determine a duration of periods of "silence" between two bursts, from which the duration of the restoration phase (which can occur after the resynchronization process) must be subtracted. The duration of the restoration phase can depend on an amplitude of ringing at the end of a burst, and this duration will increase in proportion with the amplitude of the ringing. For instance, using the above example, the duration of the restoration phase may be too long if an amplitude ratio below 57.7% is not reached.

According to an embodiment, an amplitude A(t) of falling edges of the incident bursts can be digitally shaped in correspondence with a raised cosine function, such as the following:

$$A(t)=A0*(1+\cos(\pi*t/Tf))/2,$$

the derivative of which is:

$$d(A(t)/dt=A0*\pi/Tf/2*\sin(\pi*t/Tf)$$

where A0 is a maximum amplitude of the envelope signal (e.g., a maximum amplitude of the periodic signal Slm), Tf is a duration of the falling edge, and t is time along a time axis having the inflection point i3 of the falling edge as its origin. This amplitude function A(t) can then have a constant value A0 before the inflection point i3, and a zero value after the second inflection point i4.

As shown in the table below, a derivative of the function A(t) is, accordingly, zero before and after the inflection points i3, i4. Between the inflection points i3 and i4 (e.g., during the falling edge), the derivative of the function A(t) is the derivative of the raised cosine function. This derivative is also zero at the inflection point i3 and i4, and changes constantly according to the raised cosine function between the two points. The function A(t) thus has no jump (discontinuity) in its derivative value (as described herein) of its derivative between the inflection points i2 and i4.

|  | Function A(t) | Derivative d[A(t)]/dt |
|---|---|---|
| Between i2 and i3 | A0 | 0 |
| At the point i3 (t = 0) | A0 * (1 + cos(π * 0/Tf))/2 = A0 | 0 |
| Between i3 and i4 | A0 * (1 + cos(π * t/Tf))/2 | A0 * π/Tf/2 * sin(π * t/Tf) |
| At the point i4 (t = Tf) | A0 * (1 + cos(π * Tf/Tf))/2 = 0 | 0 |
| After i4 | 0 | 0 |

The raised cosine function can also be used to shape the rising edge, and obtain a burst of the type shown in FIG. 3 (e.g., the burst B3), having an envelope signal with axial symmetry. In this case, the derivative of the envelope signal may be continuous throughout the burst.

Any other appropriate mathematical function, in particular a window function for the Fast Fourier Transform, having a derivative with the properties described herein may be used in place of the raised cosine function.

Furthermore, it will be appreciated that the periodic signal Slm implemented in such approaches need not have very steep edges that would generate an oscillatory response of the antenna circuit as shown in FIG. 1 in order for the techniques described herein to be effective or beneficial. In current approaches, a periodic signal (e.g., Slm) can be filtered before being applied to the antenna circuit and, therefore, may not be the cause of the technical problem solved by the implementations described herein, e.g., the generation of transient oscillations. For instance, if the periodic signal Slm is obtained by filtering a signal that was initially square in shape, this filtering must preferably be such that the total harmonic distortion rate of the signal Slm is lower than 20% (e.g., a ratio between a sum of respective energies of the harmonics and an energy of the fundamental of the signal Slm). When the signal Slm is digitally generated, as in implementations described herein, the signal Slm may be generated as a (ideal, near ideal, etc.) sine curve having a zero or near zero harmonic distortion rate.

Figure 4:
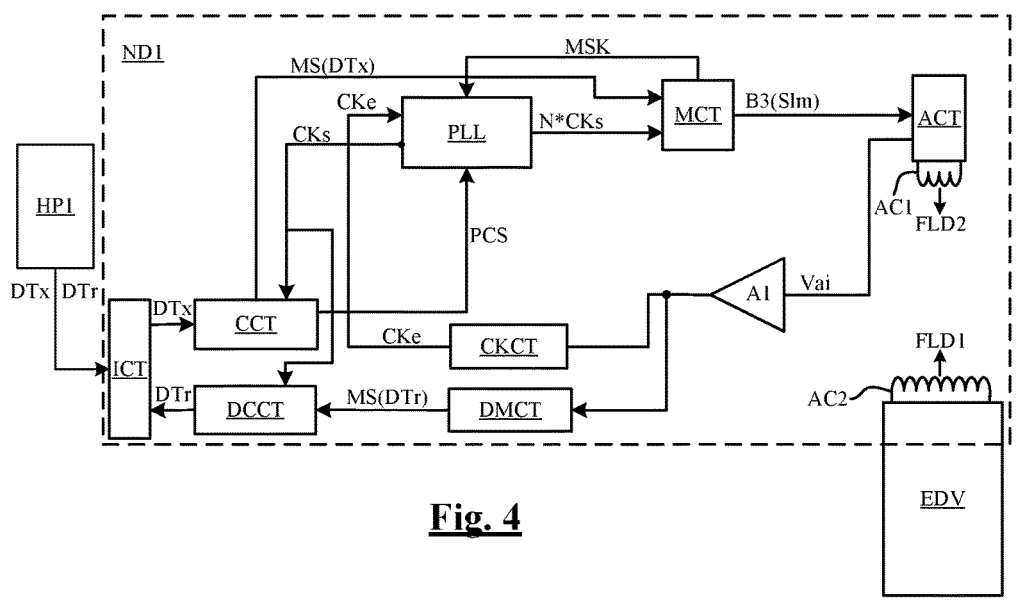
FIG. 4 is a block diagram of a near-field communication (NFC) device for implementing a method for transmitting data by inductive coupling, according to an implementation.

An example embodiment of an active load modulation NFC device (e.g., such as illustrated in FIG. 4) in which methods for transmitting data using inductive coupling will now be described. The example NFC device is described as implementing an illustrative embodiment of a method for communicating data using active load modulation, where the method is implemented without the use of a damping switch to attenuate transient oscillations after applying an incident burst, and before resynchronization of a periodic signal (e.g., Slm) between two active load modulation bursts.

The example NFC device ND1 of FIG. 4 can include a contact communication interface circuit ICT and a tuned inductive antenna circuit ACT that include an antenna coil AC1, and which may comprise various tuning components such as the capacitors Ca, Cb described above. The example NFC device can also include a demodulation circuit DMCT coupled to a decoding circuit DCCT, where the decoding circuit DCCT is configured to receive data DTr via the antenna circuit. The NFC device ND1 can also include a coding circuit CCT coupled to a modulation circuit MCT, where the modulation circuit MCT is configured to transmit data DTx via the antenna circuit ACT. The NFC device ND1 can still further include a phase locked loop PLL, and a clock extracting circuit CKCT.

As shown in FIG. 4, the NFC device ND1 can also be operationally coupled with (communicatively coupled with, etc.) a host processor HP1 and an external NFC device EDV equipped with an antenna coil AC2. The external NFC device EDV can operate in an NFC reader mode by emitting a periodic external magnetic field FLD1 that oscillates, for example, at a carrier frequency of 13.56 MHz (e.g., according to standards ISO 14443, ISO 15693, SONY FELICA®). The antenna circuits ACT and AC2 of the two devices ND1 and EDV can be tuned to this carrier frequency, or within a few percent of the carrier frequency.

The contact communication interface circuit ICT enables the device ND1 to be communicatively coupled to the host processor HP1. In other words, the contact communication interface ICT can enable the host processor HP1 to supply the NFC device ND1 with data DTx intended for the external device EDV, and receive, from the device ND1, data DTr sent by the external device EDV. The data DTx/DTr can be, for example, application data of an NFC application (transaction, payment, data exchanges, etc.). In one alternative, the NFC device ND1 can include an internal processor configured to manage contactless applications. In such an approach, the internal processor can generate the data DTx and process the data DTr without use of a separate host processor (such as the host processor HP1).

The clock extracting circuit CKCT and the demodulation circuit DMCT can receive, through an amplifier A1, an antenna signal Vai induced (generated, produced, etc.) in the antenna circuit ACT by the external magnetic field FLD1. The clock extracting circuit CKCT can supply an external clock signal CKe, the frequency of which is that of the external magnetic field, e.g., 13.56 MHz, such as in accordance with the above-mentioned standards. The phase locked loop PLL can receive the external clock signal CKe and supply an internal clock signal CKs, as well as a sampling clock signal N*CKs, where a frequency of the sampling clock signal N*CKs is N times that of the frequency of the internal clock signal CKs.

The phase locked loop PLL can implement (selectively operate in) a synchronous oscillation mode, during which a signal of the PLL is bound to (defined by, synchronized to, etc.) the external clock signal CKe, allowing the internal clock signal CKs to be phase and frequency synchronized to the external clock signal CKe. The phase locked loop PLL can also implement (selectively operate in) a free oscillation mode, where the internal clock signal CKs is no longer set in phase and frequency to (bound to, defined by, synchronized to, etc.) the external signal CKe. The free oscillation mode can be activated by a logic signal MSK of a specific value being supplied by the modulation circuit MCT.

To send data DTr to the device ND1, the external device EDV can apply, to the magnetic field FLD1, amplitude modulation using of a binary data-carrying modulation signal MS(DTr). The signal MS(DTr) can be reflected in (represented in, replicated in, superimposed on, etc.) the induced antenna signal Vai and extracted from the induced antenna signal Vai by the demodulation circuit DMCT, e.g., after removal of the 13.56 MHz carrier signal. The circuit DMCT can supply the modulation signal MS(DTr) to the circuit DCCT, which can then extract the data DTr from the supplied modulation signal MS(DTr), and provide the extracted data to the host processor HP1 via the communication interface circuit ICT.

The data DTx to be sent to the external device EDV can be supplied to the coding circuit CCT by the host processor HP1 via the communication interface circuit ICT. The circuit CCT can then supply the modulation circuit MCT with a binary data-carrying modulation signal MS(DTx). The modulation signal MS(DTx) can have a frequency derived from the frequency of the internal clock signal CKs, for example 848 kHz (e.g., in accordance with standard ISO 14443). To generate the modulation signal MS(DTx) signal, the circuit CCT can receive the internal clock signal CKs supplied by the phase locked loop PLL.

The modulation circuit MCT can be an active load modulation circuit that receives both the sampling signal N*CKs and the modulation signal MS(DTx). The modulation circuit MCT can apply bursts (e.g., B2 and/or B3) of a periodic signal Slm to the antenna circuit ACT, The bursts can be separated by periods of non-modulation, during which the signal Slm has a default value, generally 0. The periodic signal Slm can have a frequency equal to that of the internal clock signal CKs, and the bursts (B2 and/or B3) can be emitted at a rate (frequency) of the modulation signal MS(DTx).

The bursts B2 or B3 can be shaped in the manners described herein, so as to cancel out, or at least limit, transient oscillation of the antenna circuit ACT after each application of a given burst. Therefore, when the signal MS(DTx) changes to 1, the antenna circuit ACT can receive a burst B2 or B3 of the signal Slm, and the antenna coil AC1 can, in response, emit a corresponding burst of a magnetic field FLD2. The bursts of magnetic field FLD2 can be detected by the external device EDV as passive load modulation. Accordingly, the external device EDV may extract, from its own antenna signal, the signal MS(DTx) to determine the data DTx sent by the NFC device ND1.

FIGS. 5A to 5E illustrate operation of the NFC device ND1 when transmitting data DTx and, respectively, represent the internal clock signal CKs, the data signal MS(DTx), the logic signal MSK, the periodic signal Slm supplied by the modulator circuit MCT, and the antenna signal Va present in the antenna circuit ACT. Active load modulation phases Pm of duration Tm and resynchronization phases Psyn of duration Tsyn are also indicated in FIGS. 5A-5E (with specific reference to FIG. 5C).

Each load modulation phase Pm can be initiated when the signal MS(DTx) changes to 1 (FIG. 5B). The modulation circuit MCT can apply a burst B3 of the signal Slm to the antenna circuit ACT (FIG. 5D) and set the signal MSK to 0 throughout the burst (FIG. 5C), so that the phase locked loop PLL operates in free oscillation mode. The antenna signal Va (FIG. 5E) can include a component Vai induced by the external magnetic field FLD1 and a component Vam generated in the antenna circuit ACT by the signal Slm. In some implementations, the bursts (B3 in this example) may not cause transient oscillation of the component Vam in the antenna circuit ACT. Therefore, in this example, after a burst B3 has been applied to the antenna circuit ACT, the antenna signal Va may include only the component Vai induced by the external field FLD2 and the synchronization (resynchronization) phase can be immediately initiated. A value of the signal MSK t can be set back to 1 by the circuit MCT, allowing the phase locked loop PLL to resynchronize the internal clock signal CKs to the external clock signal CKe.

In embodiments where the bursts B3 leave a trace of oscillation of the component Vam of the antenna signal, a relaxation time may be provided (included, implemented, etc.) between the modulation phases Pm and the synchronization phases Psyn. Generally speaking, damping of the transient oscillation of the component Vam as a result of the specific shape given to the bursts B3 can be determined so use of the damping switch is not needed to attenuate such transient oscillations.

In other words, shaping at least the falling edges of bursts of the periodic signal, such as described herein, allows for the elimination of a damping phase that is implemented using a switch to attenuate transient oscillations, which can be particularly useful in antenna circuits having a high Q factor. In the example implementations described herein, a frequency of the signals CKe, CKs and Slm can be 13.56 MHz, and a frequency of the data signal MS(DTx) can be 848 KHz. In such implementations, one period of the data signal MS(DTx) corresponds to 16 periods of the signal Slm. The duration of the bursts B3 can be substantially greater than the duration T1 during which the signal MS(DTx) is set to 1, which can extend over 8 periods of the signal Slm. The bursts can have a rising edge of duration Tr which extends over 4 periods of the signal Slm, a plateau of duration Tp which extends over 2 periods of the signal Slm, and a falling edge of duration Tf which extends over 4 periods of the signal Slm, such that Tr+Tp+Tf/2=T1. The duration of the bursts B3 can, therefore, be greater than the duration T1 of Tf/2, e.g., 2 periods of the signal Slm. The synchronization (resynchronization) period can then extend (e.g., be performed, be implemented, etc.) over the 6 remaining periods (of the 16 periods indicated above) of the signal Slm.

FIG. 6 is a block diagram that illustrates an example embodiment of a phase locked loop PLL1 that can be implemented as the phase locked loop PLL of FIG. 4 and an example embodiment of a modulation circuit MCT1 that can be implemented as the modulation circuit MCT of FIG. 4.

In FIG. 6, the phase locked loop PLL1 includes a phase comparator PFD, a charge pump CP, a loop filter LF, a voltage controlled oscillator VCO and a frequency divider DIV (e.g., a divide by N divider, which can be implemented, for example, by a counter modulo N). The voltage controlled oscillator VCO can supply the modulation circuit MCT1 with the sampling signal N*CKs. This signal can also be applied to the divider DIV, which can supply the internal clock signal CKs at an input of the comparator PFD, and to inputs of the circuits CCT and DCCT (in FIG. 4). Another input of the comparator PFD can receive the external clock signal CKe and a control input of the comparator PFD can receive the signal MSK. When the signal MSK is set to 1, the comparator PFD can supply the charge pump CP with two error signals U, D ("Up" and "Down"), which can represent a phase error and/or a frequency error between the signals CKe and CKs. The charge pump CP can supply the filter LF with a voltage Vp that increases or decreases according to the signals U, D. The voltage Vp can be applied to the filter LF. An output of the filter LF can, in turn, supply a loop voltage V1 that is applied to the voltage controlled oscillator VCO.

Setting (changing, etc.) the signal MSK to 0 can stop operation of the phase comparator PFD. The signals U and D can then be forced to 0, which can also cause the charge pump CP to stop operation, which can result in freezing the loop voltage V1 (e.g., maintaining, within an acceptable threshold, a constant loop voltage) that is applied to the oscillator VCO. Accordingly, the phase locked loop PLL1 would continue to oscillate in its free oscillation mode at the last synchronized frequency reached before the signal MSK changed to 0.

The modulation circuit MCT1 can synthetize the bursts (e.g., B3) of the periodic signal Slm based on a set of digital values that can be stored in lookup tables LUT1 to LUT9. The lookup tables LUT1 to LUT9 can, in an implementation, be located, for example, in a non-volatile memory MEM included in the modulation circuit MCT1. As shown in FIG. 7, such stored digital values can be points Pi of a curve of a digital signal Slmd that has a desired shape of bursts (e.g., B3) of the analog signal Slm. In this example, Slmd is shown as a pure sine curve, with an amplitude that is determined by (defined by, etc.) an envelope signal E3 of the burst B3. In the embodiment illustrated in FIG. 6, each of the tables LUT1, LUT2, LUT3 and LUT4 can be assigned (used, and so forth) to store data representing points Pi of a respective period of the signal Slmd during a rising edge of the burst B3, e.g., between the inflection points i1 and i2. Similarly, each of the tables LUT6, LUT7, LUT8 and LUT9 can be assigned (used, etc.) to the store data representing points Pi of a respective period of the signal Slmd during the falling edge of the burst B3, e.g., between the inflection points i3 and i4. Also in the example implementation of FIG. 6 (as well as other implementations) the table LUT5 can be assigned (used, etc.) to store data representing points Pi corresponding to two periods of the signal CKs during the plateau phase of the burst B3, e.g., between the inflection points i2 and i3. The number of points Pi provided to synthetize each period of the signal Slmd can be determined based on a sampling frequency N*CKs that is supplied by the phase locked loop PLL1 of FIG. 6 and is, in this example, equal to N.

With further reference to FIG. 6, the modulation circuit MCT1 can include a state machine SM, a digital-to-analog converter DAC, and an amplifier A1. The state machine SM can include an address counter ADCNT configured to address and read the look-up tables LUT1-LUT9, e.g., from the memory MEM. In this example, the address counter ADCNT can be incremented (paced, clocked, etc.) by the signal N*CKs. The state machine SM can also receive the data signal MS(DTx) and be configured to initiate reading of tables LUT1-LUT9 when the signal MS(DTx) changes from 0 to 1, such that emission of a burst B3 is synchronized to the data signal MS(DTx). The output of the memory MEM can supply the points Pi to the digital-to-analog converter DAC. In turn, an output of the digital-to-analog converter DAC can supply (based on the points Pi) the antenna circuit ACT, through the amplifier A1, with the bursts B3 of the analog periodic signal Slm.

According to one embodiment, the state machine SM can receive a phase control signal PCS and can be configured to phase shift the periodic signal Slmd/Slm by an angle determined by the value of the phase control signal PCS, where the phase shift can be relative to the internal clock signal CKs, which (after synchronization or resynchronization) should be in phase (or in a predetermined phase relationship) with the external clock signal CKe. In some implementations, bursts of magnetic field FLD2 can be generated such that they have a phase shift relative to the external magnetic field FLD1, which can facilitate improved detection of active load modulation by the external device EDV.

The modulation circuit MCT1 of FIG. 6, when implemented as the modulation circuit MCT of FIG. 4, can provide flexibility in controlling the envelope signal E3 of the burst B3, as each point Pi of the digital signal Slmd can be mathematically calculated before being stored in the look-up tables LUT1 to LUT9. In such approaches, the envelope signal E3 can, therefore, be strictly controlled to conform to a desired shaping function, such as, for example, a raised cosine function, as described herein.

FIG. 8 shows another example embodiment of a modulation circuit MCT2, which can be implemented as the modulation circuit MCT in FIG. 4. In some implementations, the modulation circuit MCT2 can be implemented as a lower cost alternative to the modulation circuit MCT1 (or other similar modulation circuits). In the example embodiment of FIG. 8, the data-carrying binary signal MS(DTx) can be used as an envelope signal for shaping the bursts B3, and can have a duty cycle that is controlled by the coding circuit CCT. As discussed above with respect to the modulation circuit MCT1 of FIG. 6, in the modulation circuit MCT2 in FIG. 8, one period of the data signal MS(DTx) can correspond to 16 periods of the signal Slm.

As shown in FIG. 8, the circuit MCT2 includes low-pass filters FLT1, FLT2, which can be of a first or of a second order. The modulation circuit MCT2 can also include a mixer MIX, an amplifier A2, and an edge detection circuit EDT. The edge detection circuit EDT can supply the phase locked loop PLL (e.g., of FIG. 4) with the signal MSK. The filter FLT1 can receive the data-carrying logic signal MS(DTx) as an envelope signal and supply, at an input of the mixer MIX, an envelope signal E3, such as previously described, having rising and falling edges that are softened (flattened, etc.) by the filtering of the first or second order by the filters FLT1 and FLT2, where a derivative of the envelope signal E3 is continuous (as described herein). The internal clock signal CKs supplied by the phase locked loop, in certain implementation, can be square in shape and transformed, e.g., by the filter FLT2, into a periodic signal Slm with low harmonic distortion before being applied to a second input of the mixer MIX. The output of the mixer MIX can supply the antenna circuit ACT, through the amplifier A2, with bursts B3 of the signal Slm. Finally, the edge detector EDT can receive the data signal MS(DTx) and the clock signal CKs, and set the signal MSK to 0 in response to detecting a change from 0 to 1 of the signal MS(DTx).

According to one embodiment, the signal MS(DTx) can be maintained at a value of 1 during 6 cycles of the internal clock signal CKs, and at a value of 0 during 10 clock cycles, e.g., which corresponds with a duty cycle of 6/16, as compared to 10/16 as previously discussed. Such an approach can take into account temporal spread of the rising and falling edges of the signal MS(DTx) caused by the filter FLT1.

In an implementation, a setting for a phase of the signal Slm could be provided in the modulation circuit MCT2 of FIG. 8, for example, by inserting an adjustable phase shifter at the second input of the mixer MIX. In another embodiment, the internal clock signal CKs can be applied without being filtered at the second input of the mixer MIX, and the filter FLT2 could be arranged at (coupled with) an output of the amplifier A2.

As indicated above, the approaches described herein may have various other alternative implementations and applications to other uses than those discussed above. For instance, such approaches and/or techniques may be applied to the transmission of data in an NFC reader mode, to more precisely control the duration of the amplitude modulation gaps of the magnetic field emitted by removing spurious oscillations appearing in the modulation gaps, for example, to increase a data rate of data transmitted by reducing the duration of the modulation gaps, as well as a number of appropriate applications.

A data transmitting/receiving device that implements such approaches can also be used for various other applications. For instance, in an example implementation shown in FIG. 9, the device ND1 is integrated into a portable device HD1 and is linked to one or more host processors, here two host processors HP1, HP2 that can use the device ND1 as a contactless communication interface (NFC interface). The portable device HD1 can be, for example, a mobile telephone, a digital music player, a personal digital assistant (PDA), or any other appropriate device. The processor HP1 can be a main processor of the device HD1, or can be a secure processor, such as a smart card processor. The processor HP2 of the device HD1 may, for example, be a baseband processor of a mobile telephone, which can also provide for communications via a mobile telephony channel.

FIGS. 10 and 11 illustrate another example of a portable device, a smart card HD2. FIGS. 10 and 11 illustrate, respectively, a top view and a bottom view of the smart card HD2. In the smart card HD2, the NFC device ND1 is coupled to a host processor HP1, and the assembly can be integrated into a plastic medium CD to form the smart card HD2. The antenna coil AC1 of the device ND1 can be, for example, a coplanar coil having one or more turns. On the bottom side of the smart card HD2 shown in FIG. 11, the smart card HD2 includes a group of contacts CP disposed on the plastic medium CD. The smart card HD2 may, for example, take the form of an NFC SIM card. The group of contacts CP may include contacts C1 to C8 according to the standard ISO 7816. The smart card HD2 may also take the form of a smart card intended to be inserted into a number of types of devices (e.g., mobile telephones, personal computers, laptop computers, tablet computers, etc.) as an NFC communication interface.

What is claimed is:

1. A method for transmitting data by inductive coupling, the method comprising:
    applying a plurality of bursts of a periodic signal to a tuned inductive antenna circuit, the plurality of bursts of the periodic signal being applied at a rate of a data-carrying signal;

producing, in the tuned inductive antenna circuit, an antenna signal, the antenna signal generating a magnetic field; and delimiting an amplitude of each burst of the plurality of bursts of the periodic signal in accordance with an envelope signal having a rising edge and a falling edge, the delimiting the amplitude of each burst of the plurality of bursts of the periodic signal including generating the plurality of bursts of the periodic signal using a set of points, the set of points defining, by discrete values, a burst of the plurality of bursts of the periodic signal.

2. The method of claim 1, further comprising:
reading the set of points from a memory; and
applying, after reading the set of points from the memory, the set of points to a digital-to-analog converter to generate the burst of the plurality of bursts of the periodic signal.

3. The method of claim 2, wherein the reading the set of points from the memory is initiated when the data-carrying signal has a predetermined value.

4. The method of claim 2, wherein the set of points includes subsets of points, each subset of points defining a respective portion of the burst of the plurality of bursts of the periodic signal, the respective portions including a rising edge portion, a plateau phase portion and a falling edge portion.

5. The method of claim 1, further comprising determining the set of points so as to flatten a slope of the falling edge of the envelope signal, as compared to a square wave envelope signal, so as to attenuate or prevent transient oscillations of the antenna signal.

6. The method of claim 5, wherein the falling edge of the envelope signal is shaped such that, immediately after applying a burst of the periodic signal, the antenna signal has, in the absence of an external magnetic field, an amplitude that is lower than a percentage of a maximum amplitude of the antenna signal during the application of the burst of the periodic signal, the percentage being between 1% and 50%.

7. The method of claim 1, wherein the periodic signal has a total harmonic distortion rate lower than 20 %.

8. The method of claim 1, further comprising: transmitting data by active load modulation including:
applying the plurality of bursts of the periodic signal to the tuned antenna circuit in the presence of an external alternating magnetic field; and
synchronizing a frequency of the periodic signal with a frequency of the external alternating magnetic field, the synchronizing occurring between application of a first burst of the plurality of bursts of the periodic signal to the tuned inductive antenna circuit and application of a second burst of the plurality of bursts of the periodic signal to the tuned inductive antenna circuit.

9. A device for transmitting data by inductive coupling, the device comprising:
a tuned inductive antenna circuit; and
an amplitude modulation circuit configured to apply a plurality of bursts of a periodic signal to the tuned inductive antenna circuit to produce an antenna signal generating a magnetic field, the amplitude of each burst of the plurality of bursts of the periodic signal being delimited by an envelope signal having a rising edge and a falling edge,
the amplitude modulation circuit being further configured to generate the plurality of bursts of the periodic signal based on a set of points, the set of points defining, by discrete values, a burst of the plurality of bursts of the periodic signal.

10. The device of claim 9, wherein the amplitude modulation circuit is further configured to:
read the set of points from a memory; and
apply, after reading the set of points from the memory, the set of points to a digital-to-analog converter to generate the burst of the plurality of bursts of the periodic signal.

11. The device of claim 10, wherein the plurality of bursts of the periodic signal are applied to the tuned inductive antenna circuit at a rate of a data-carrying signal, the amplitude modulation circuit being further configured to read the set of points from the memory in response to the data-carrying signal having a predetermined value.

12. The device of claim 10, wherein the set of points includes subsets of points, each subset of points defining a respective portion of the burst of the plurality of bursts of the periodic signal, the respective portions including a rising edge portion, a plateau phase portion and a falling edge portion.

13. The device of claim 9, wherein the set of points defines the envelope signal such that a slope of the falling edge of the envelope signal, as compared to a square wave envelope signal, is flattened so as to attenuate or prevent transient oscillations of the antenna signal.

14. The device of claim 13, wherein the falling edge of the envelope signal is shaped such that, immediately after applying a burst of the periodic signal, the antenna signal has, in the absence of an external magnetic field, an amplitude that is lower than a percentage of a maximum amplitude of the antenna signal during the application of the burst of the periodic signal, the percentage being between 1% and 50%.

15. The device of claim 9, wherein the amplitude modulation circuit is further configured to transmit data by active load modulation by applying the plurality of bursts of the periodic signal to the tuned inductive antenna circuit in the presence of an external alternating magnetic field, the device further comprising:
a circuit configured to synchronize a frequency of the periodic signal with a frequency of the external alternating magnetic field, the synchronizing occurring between application of a first burst of the plurality of bursts of the periodic signal to the tuned inductive antenna circuit and application of a second burst of the plurality of bursts of the periodic signal to the tuned inductive antenna circuit.

16. A portable electronic object comprising:
a device for transmitting data by inductive coupling, the device including:
a tuned inductive antenna circuit; and
an amplitude modulation circuit configured to apply a plurality of bursts of a periodic signal to the tuned inductive antenna circuit to produce an antenna signal generating a magnetic field, the amplitude of each burst of the plurality of bursts of the periodic signal being delimited by an envelope signal having a rising edge and a falling edge,
the amplitude modulation circuit being further configured to generate the plurality of bursts of the periodic signal based on a set of points, the set of points defining, by discrete values, a burst of the plurality of bursts of the periodic signal.

17. The portable electronic object of claim 16, wherein the amplitude modulation circuit is further configured to:
read the set of points from a memory; and apply, after reading the set of points from the memory, the set of points to a digital-to-analog converter to generate the burst of the plurality of bursts of the periodic signal.

18. The portable electronic object of claim 16, wherein the set of points defines the envelope signal such that a slope of the falling edge of the envelope signal, as compared to a square wave envelope signal, is flattened, so as to attenuate or prevent transient oscillations of the antenna signal.

19. The portable electronic object of claim 18, wherein the falling edge of the envelope signal is shaped such that, immediately after applying a burst of the periodic signal, the antenna signal has, in the absence of an external magnetic field, an amplitude that is lower than a percentage of a maximum amplitude of the antenna signal during the application of the burst of the periodic signal, the percentage being between 1% and 50%.

20. The portable electronic object of claim 16, wherein the amplitude modulation circuit is further configured to transmit data by active load modulation by applying the plurality of bursts of the periodic signal to the tuned inductive antenna circuit in the presence of an external alternating magnetic field, the device further comprising:
   a circuit configured to synchronize a frequency of the periodic signal with a frequency of the external alternating magnetic field, the synchronizing occurring between application of a first burst of the plurality of bursts of the periodic signal to the tuned inductive antenna circuit and application of a second burst of the plurality of bursts of the periodic signal to the tuned inductive antenna circuit.

* * * * *